(12) United States Patent
Zhang et al.

(10) Patent No.: US 12,013,961 B2
(45) Date of Patent: Jun. 18, 2024

(54) RESOURCE-EFFICIENT ROW-LEVEL SECURITY IN DATABASE SYSTEMS

(71) Applicant: SAP SE, Walldorf (DE)

(72) Inventors: Sen Zhang, Xi'an (CN); De-Li Xu, Xi'an (CN); Zhi-Peng Dong, Xi'an (CN); Jixiang Xv, Xi'an (CN); Sheng Cheng, Xi'an (CN); Ruiming Dang, Xi'an (CN)

(73) Assignee: SAP SE, Walldorf (DE)

( * ) Notice: Subject to any disclaimer, the term of this patent is extended or adjusted under 35 U.S.C. 154(b) by 14 days.

(21) Appl. No.: 17/747,115

(22) Filed: May 18, 2022

(65) Prior Publication Data
US 2023/0376623 A1    Nov. 23, 2023

(51) Int. Cl.
G06F 17/30     (2006.01)
G06F 12/14     (2006.01)
G06F 16/21     (2019.01)
G06F 16/28     (2019.01)
G06F 21/62     (2013.01)

(52) U.S. Cl.
CPC ...... *G06F 21/6227* (2013.01); *G06F 12/1491* (2013.01); *G06F 16/21* (2019.01); *G06F 16/284* (2019.01)

(58) Field of Classification Search
CPC ........ G06F 16/13; G06F 16/24; G06F 16/156; G06F 21/00; G06F 21/30; G06F 2221/21; H04L 63/10
See application file for complete search history.

(56) References Cited

U.S. PATENT DOCUMENTS

| | | | | |
|---|---|---|---|---|
| 7,739,298 B1* | 6/2010 | Crim | ................... | G06F 21/6227 |
| | | | | 715/741 |
| 7,865,520 B2* | 1/2011 | Shimizu | .............. | H04L 67/1097 |
| | | | | 707/781 |
| 8,448,240 B2* | 5/2013 | Hammoutene | ..... | G06F 21/6245 |
| | | | | 713/153 |
| 8,984,602 B1* | 3/2015 | Bailey | ..................... | G06F 21/35 |
| | | | | 726/19 |
| 9,043,309 B2* | 5/2015 | Ahmed | ................... | G06F 21/30 |
| | | | | 707/748 |
| 10,545,984 B2 | 1/2020 | Zhang et al. | | |
| 10,887,305 B1* | 1/2021 | Harris | ...................... | G06F 21/44 |
| 11,082,487 B1* | 8/2021 | Jain | .................... | H04L 67/1089 |
| 11,748,503 B1* | 9/2023 | Patel | ..................... | G06Q 40/03 |
| | | | | 726/28 |

(Continued)

*Primary Examiner* — Hung D Le
(74) *Attorney, Agent, or Firm* — Fish & Richardson P.C.

(57) ABSTRACT

Methods, systems, and computer-readable storage media for receiving a query request including authorization data and a query, the authorization data indicating a privilege level index, determining a set of row ranges based on the privilege level index and a row range table, the set of row ranges including one or more row ranges having a privilege level associated therewith in the row range table, providing an initial results set including one or more records of a data table that are determined to be responsive, determining a final results set including at least one record of the initial results set, the at least one record being included in the final results set in response to determining that the at least one record is included in a row range of the set of row ranges, and outputting the final results set as at least a portion of a query result.

20 Claims, 10 Drawing Sheets

(56) References Cited

U.S. PATENT DOCUMENTS

| | | | |
|---|---|---|---|
| 11,789,911 B1* | 10/2023 | Surabhi | G06F 21/6227 707/802 |
| 2004/0044655 A1* | 3/2004 | Cotner | G06F 16/284 |
| 2007/0192137 A1* | 8/2007 | Ombrellaro | G06Q 10/10 600/300 |
| 2009/0199273 A1* | 8/2009 | Yalamanchi | G06F 21/6227 726/4 |
| 2015/0106382 A1* | 4/2015 | Liu | G06F 16/221 707/769 |
| 2018/0137302 A1* | 5/2018 | Crimm | H04L 9/0891 |
| 2018/0183812 A1* | 6/2018 | Maresca | H04L 9/3247 |
| 2018/0255104 A1* | 9/2018 | Sander | G06F 21/6227 |
| 2019/0028516 A1* | 1/2019 | Sander | G06F 21/56 |
| 2019/0394037 A1* | 12/2019 | Sun | H04L 65/765 |
| 2020/0117826 A1* | 4/2020 | Lilly, Jr. | G06F 16/24539 |
| 2020/0250676 A1* | 8/2020 | Sierra | H04L 9/0897 |
| 2020/0272750 A1* | 8/2020 | Hoeffer | G06F 21/6218 |
| 2020/0320210 A1* | 10/2020 | Gruszecki | G06F 21/6218 |
| 2020/0379988 A1* | 12/2020 | Seiden | G06F 16/2428 |
| 2021/0019434 A1* | 1/2021 | Bibliowicz | G06F 21/6218 |
| 2021/0044978 A1* | 2/2021 | Michaelis | H04W 12/63 |
| 2021/0117557 A1* | 4/2021 | Al-Shanqity | G06F 21/6218 |
| 2021/0203487 A1* | 7/2021 | Jia | H04L 9/0825 |
| 2021/0350886 A1* | 11/2021 | Joos | G06F 21/6245 |
| 2021/0409192 A1* | 12/2021 | Gollogly | G06F 16/2379 |
| 2022/0138342 A1* | 5/2022 | Avanes | G06F 21/6227 726/26 |
| 2022/0215107 A1* | 7/2022 | Wong | G06F 16/24547 |
| 2022/0374397 A1* | 11/2022 | Wong | G06F 16/2456 |
| 2023/0092849 A1* | 3/2023 | Warshavsky | G06F 21/6218 726/28 |
| 2023/0112966 A1* | 4/2023 | Sehgal | G06F 21/577 726/25 |
| 2023/0169121 A1* | 6/2023 | Yuen | G06F 16/217 707/781 |
| 2023/0217250 A1* | 7/2023 | Kahn | H04W 12/08 726/4 |
| 2023/0267225 A1* | 8/2023 | Costello | G06F 21/604 726/27 |
| 2023/0283640 A1* | 9/2023 | Shapira | G06F 21/6218 726/26 |
| 2023/0315893 A1* | 10/2023 | Levandoski | G06F 16/25 726/27 |

\* cited by examiner

RESOURCE-EFFICIENT ROW-LEVEL SECURITY IN DATABASE SYSTEMS

BACKGROUND

Database systems store data that can be queried. For example, a query can be submitted to a database system, which processes the query and provides a result. Queries are submitted in a query language. An example query language includes, without limitation, the structured query language (SQL), which can be described as a standard database language that is used to create, maintain and retrieve data stored in a relational database (e.g., a database, in which data is stored in relational tables). In some instances, queries can include multiple layers of nested sub-queries. Access to data can be restricted. For example, users and/or applications can have access to some data and may be denied access to other data. In querying a database system, an authorization check is performed to ensure that a source of the query (e.g., a user and/or an application querying a database system) is authorized to access data that may be returned in response to the query.

SUMMARY

Implementations of the present disclosure are directed to providing row-level security in databases systems. More particularly, implementations of the present disclosure are directed to providing row-level security in database systems by using an authorization information table and a row range table. As described in further detail herein, the row range table maps authorization data of the authorization information table to sets of row ranges for resource-efficient querying of database systems.

In some implementations, actions include receiving, by a database system, a query request including authorization data and a query, the authorization data indicating a privilege level index, determining, by the database system, a set of row ranges based on the privilege level index and a row range table, the set of row ranges including one or more row ranges having a privilege level associated therewith in the row range table, providing, by the database system, an initial results set including one or more records of a data table that are determined to be responsive, determining, by the database system, a final results set including at least one record of the initial results set, the at least one record being included in the final results set in response to determining that the at least one record is included in a row range of the set of row ranges, and outputting, by the database system, the final results set as at least a portion of a query result. Other implementations of this aspect include corresponding systems, apparatus, and computer programs, configured to perform the actions of the methods, encoded on computer storage devices.

These and other implementations can each optionally include one or more of the following features: determining a set of row ranges based on the privilege level index and a row range table includes comparing the privilege level index to each privilege level to provide a comparison, and including respective row ranges in the set of row ranges based on respective comparisons; a comparison indicates a non-zero value and, in response, a respective row range is included in the set of row ranges; a comparison indicates a less than or equal to relationship and, in response, a respective row range is included in the set of row ranges; the authorization data includes one or more of group data and role data; the privilege level index and privilege levels of the row range table are each provided as an n-bit number; and the row range table is specific to the data table.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to providing row-level security in databases systems. More particularly, implementations of the present disclosure are directed to providing row-level security in database systems by using an authorization information table and a row range table. As described in further detail herein, the row range table maps authorization data of the authorization information table to sets of row ranges for resource-efficient querying of database systems.

Implementations can include actions of receiving, by a database system, a query request including authorization data and a query, the authorization data indicating a privilege level index, determining, by the database system, a set of row ranges based on the privilege level index and a row range table, the set of row ranges including one or more row ranges having a privilege level associated therewith in the row range table, providing, by the database system, an initial results set including one or more records of a data table that are determined to be responsive, determining, by the database system, a final results set including at least one record of the initial results set, the at least one record being included in the final results set in response to determining that the at least one record is included in a row range of the set of row ranges, and outputting, by the database system, the final results set as at least a portion of a query result.

Figure 1:
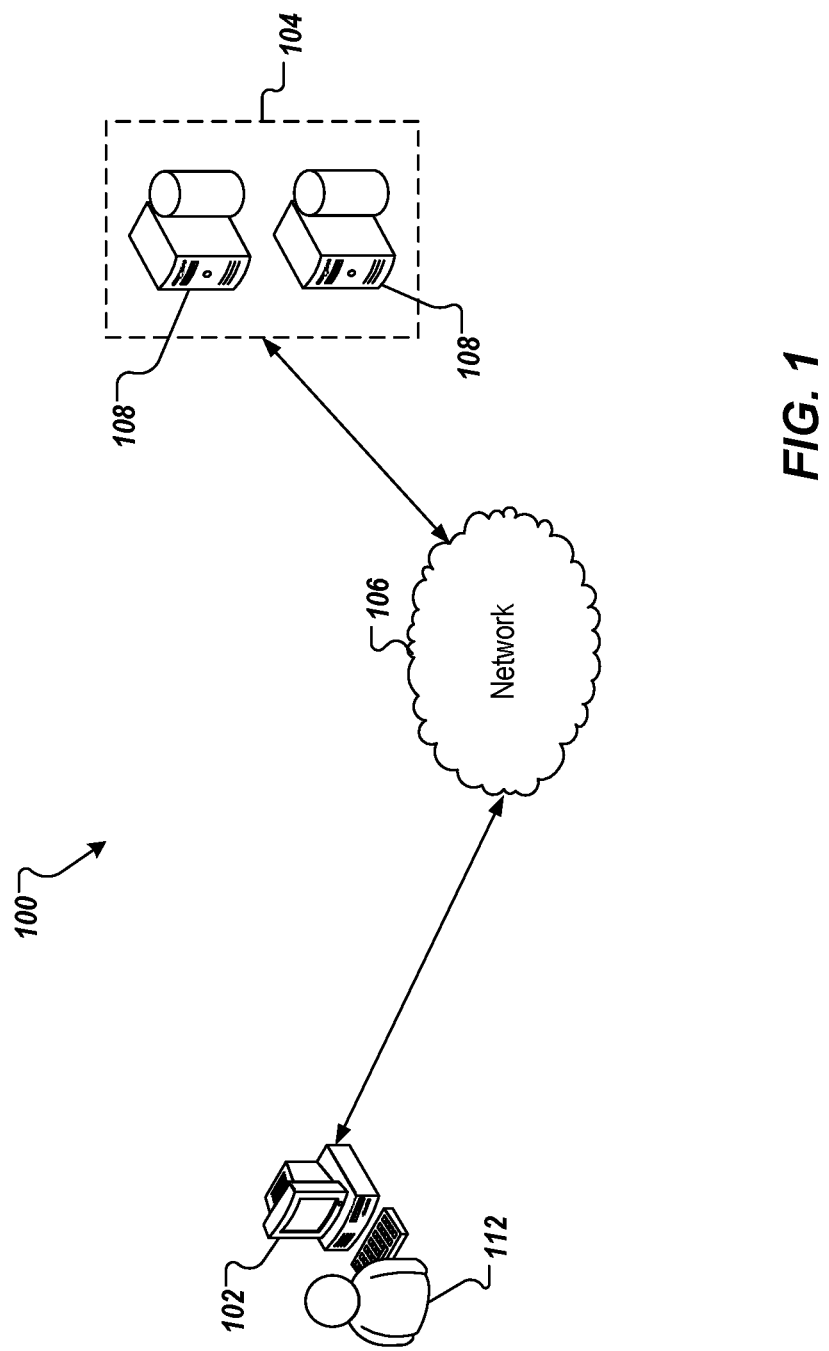
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a database system that stress data in tables. In some examples, the database system receives a query (e.g., from a user, from an application) that includes query authorization data (e.g., user role data, user group data). For example, the user 112 can submit a query to the database system through the client device 102. In some examples, the query includes query authorization data, such as user role data and/or user group data. For example, the user 112 can be logged into the database system and be associated with user profile data, which includes the query authorization data. As described in further detail herein, users, such as the user 112, are associated with privilege levels that enable access to certain data and prohibit access to certain data at a row level.

To provide further context for implementations of the present disclosure, and as introduced above, database systems store data that can be queried. Increasingly, database systems store massive amounts of data as data warehousing, big data, and Internet-Of-Things (IoT), for example, progress. In some database systems, data is stored in tables that include rows, each row representing a record, and columns, each column representing a field of a record. In some examples, a query can be submitted to a database system, which processes the query and provides a result. Queries are submitted in a query language. An example query language includes, without limitation, the structured query language (SQL), which can be described as a standard database language that is used to create, maintain and retrieve data stored in a relational database (e.g., a database, in which data is stored in relational tables).

Access to data can be restricted. That is, for example, security can be applied to data, such that only authorized users are able to access the data. This can be referred to as access control. For example, users and/or applications can have access to some data and may be denied access to other data. In querying a database system, an authorization check is performed to ensure that a source of the query (e.g., a user and/or an application querying a database system) is authorized to access data that may be returned in response to the query.

One concept in providing multi-level and fine granular access control is row-level security, which applies access control to records by row. However, traditional row-level security suffers from disadvantages. For example, traditional row-level security reduces query performance in applying row-level security during query processing. That is, queries can take longer and expend more technical resources (e.g., processing, memory) than desired. Such performance degradation is compounded in querying against relatively large tables using row-level security.

Figure 2:
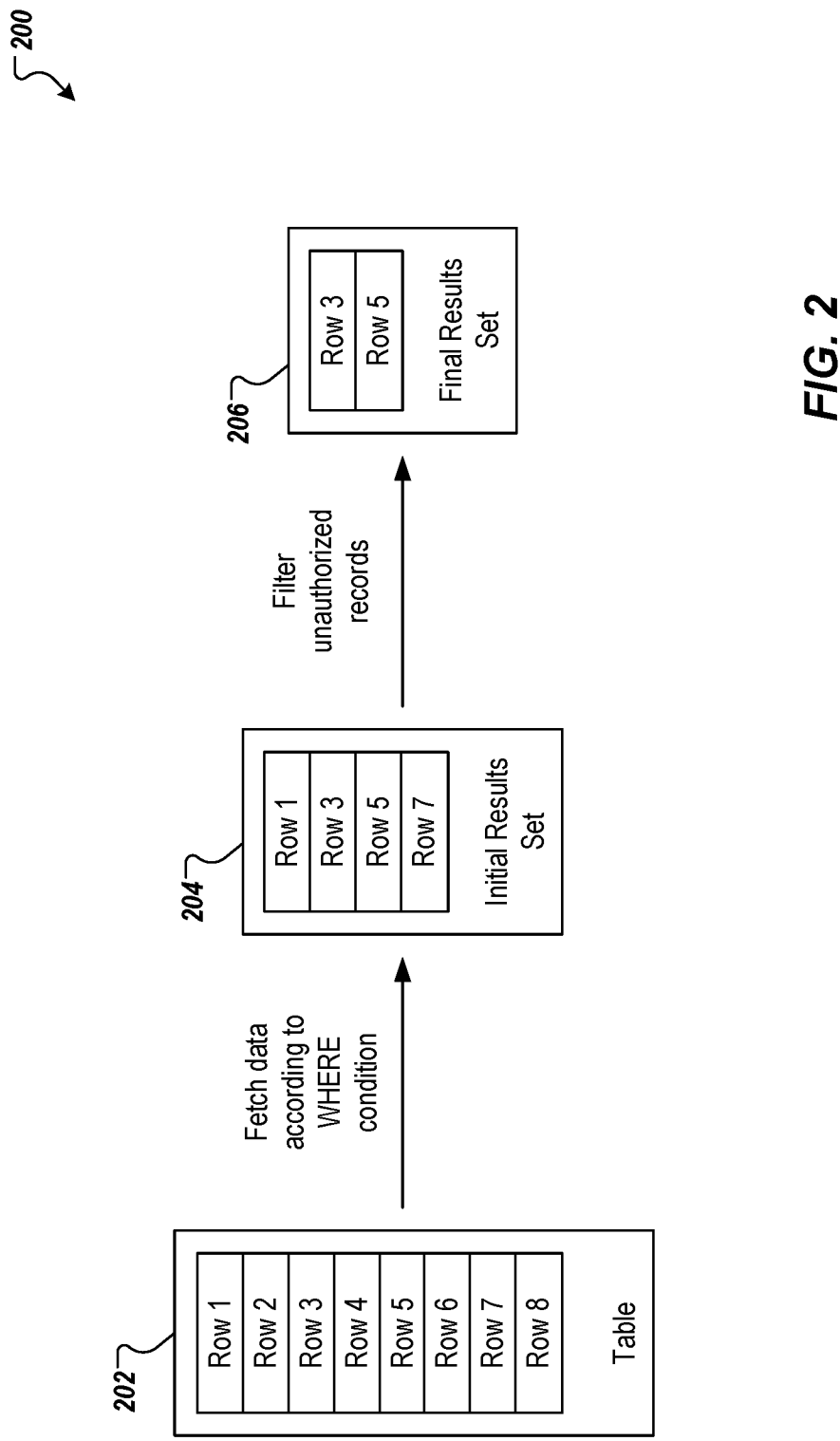
FIG. 2 represents querying using traditional row-level security.

FIG. 2 represents querying using traditional row-level security. In the example of FIG. 2, a data table 202 is depicted, from which one or more data records are to be returned as a result of a query. For example, the data table 202 includes rows, each row representing a record that could be returned in response to a query. In the example of FIG. 2, a query (e.g., SQL query) is received by a database system (in which the data table 202) is stored, the query including a where condition (e.g., select*from T where name='ACME'). In response to the query, an initial results set 204 is provided. The initial results set 204 includes data records (rows) that are responsive to the query (e.g., rows having ACME in the name field). Prior to returning results (e.g., to a user that submitted the query), the results are filtered to remove any records that are not accessible to the user. To this end, authorization data of the user is provided to determine which records the user that submitted the query is able to access (and which records the user is not allowed to access). The initial results set 204 is filtered based on the authorization data to provide a final results set 206, which is returned to the user as the result of the query.

Such an approach to row-level security, however, is inefficient in terms of time- and resource-consumption. For example, and particularly for tables having a large number of records, determining if a user has access permission row-by-row and removing unauthorized records are time- and resource-consuming processes. That is, for each row a privilege check is executed to determine whether the particular user is authorized to view the respective record. That is, each privilege level is checked multiple times (e.g., hundreds, thousands of times), one time for each row in an initial results set.

In view of the above context, implementations of the present disclosure provide time- and resource-efficient row-level security for database systems. As described in further detail herein, an authorization information table and a row range table are provided, and records in a data table are stored in a privilege order, the data table including a privilege column indicating a privilege-level of respective rows (records). As described in further detail herein, the privilege check process is executed only once for each privilege instead of row-by-row. In this manner, rows that require higher privilege levels are skipped. Further, because database systems use a mechanism of page/block iteration instead of per-tuple iteration, implementations of the present disclosure improve access performance and provide resource efficiencies. In some examples, privilege levels are expressed as a bitmap (e.g., an n-bit value) representing the privilege required by a respective row. In this manner, a bitwise operation can be used to compare privilege levels, which is more computationally efficient than a string comparison, for example.

Implementations of the present disclosure provide for access control based on roles and based on groups. More particularly, implementations of the present disclosure provide for role-based row-level security and group-based row-level security.

Figure 3A:
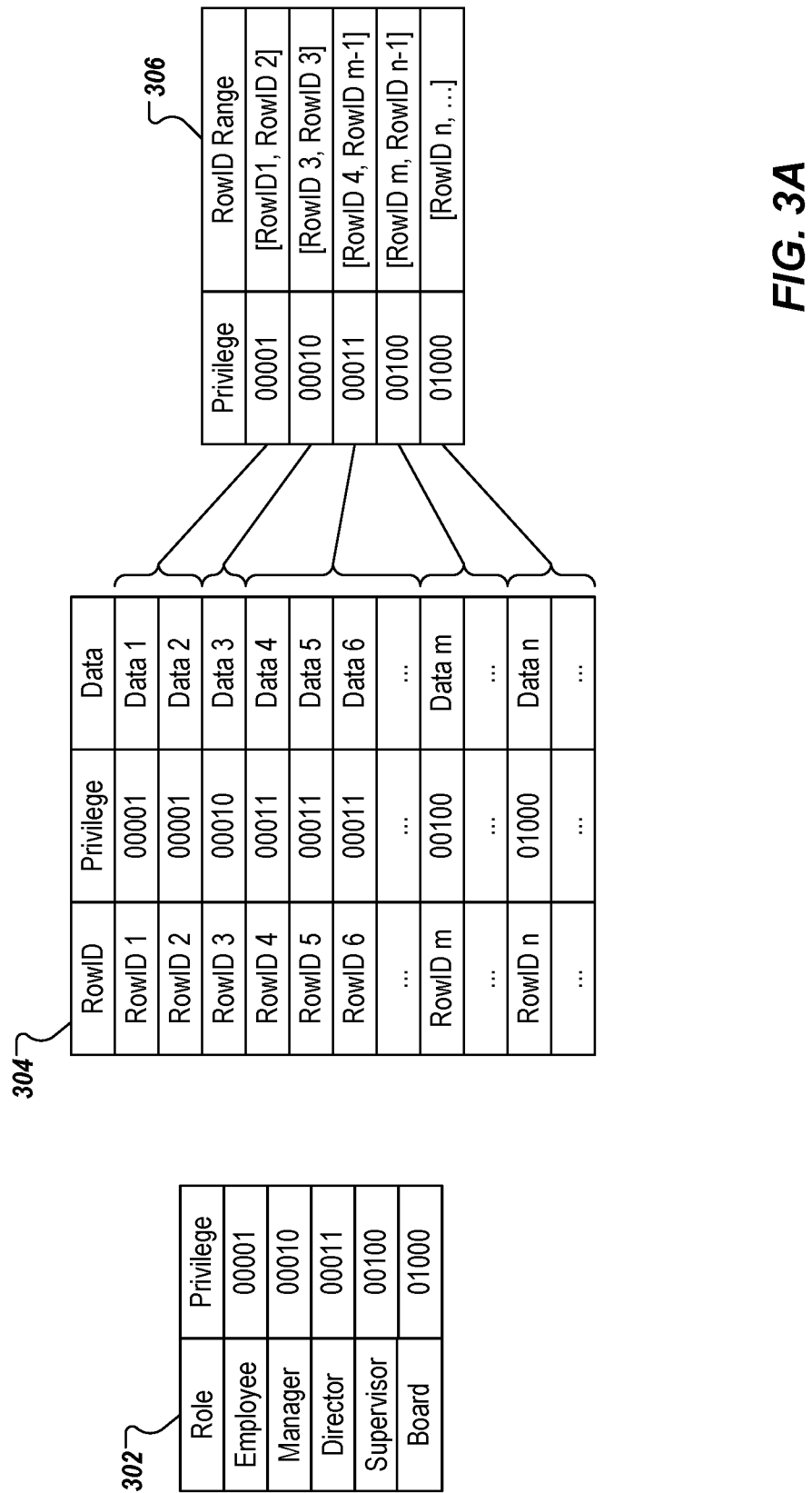
FIGS. 3A-3C depict an example of role-based row-level security in accordance with implementations of the present disclosure.
Figure 3B:
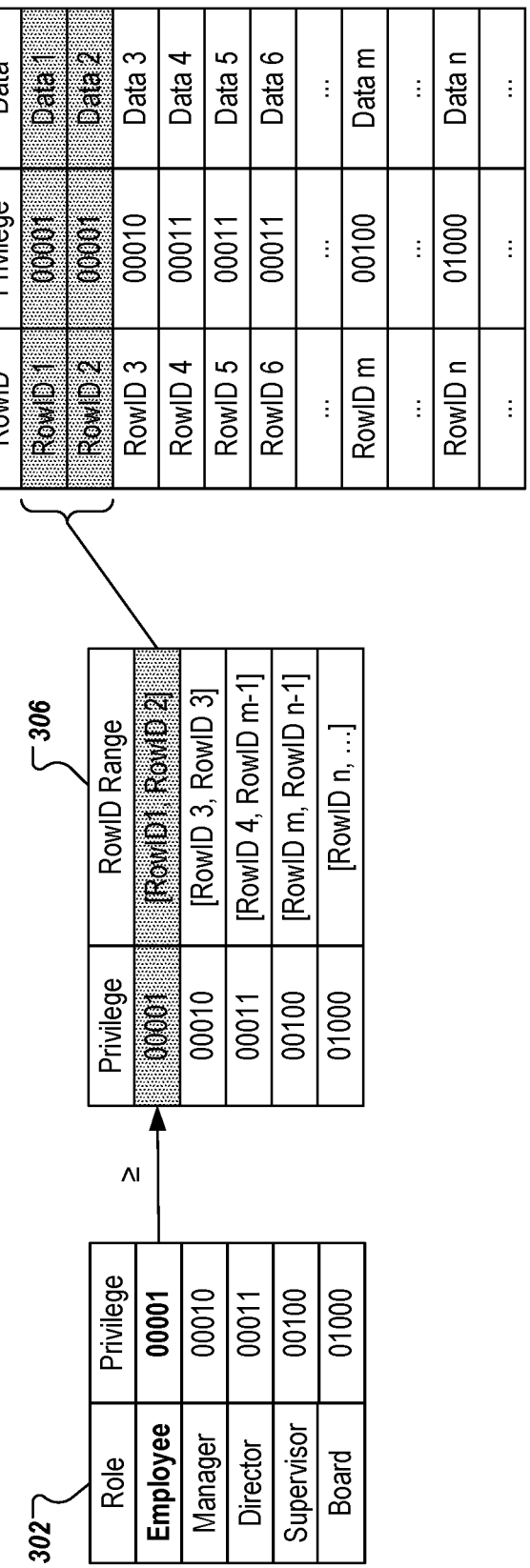
Figure 3C:
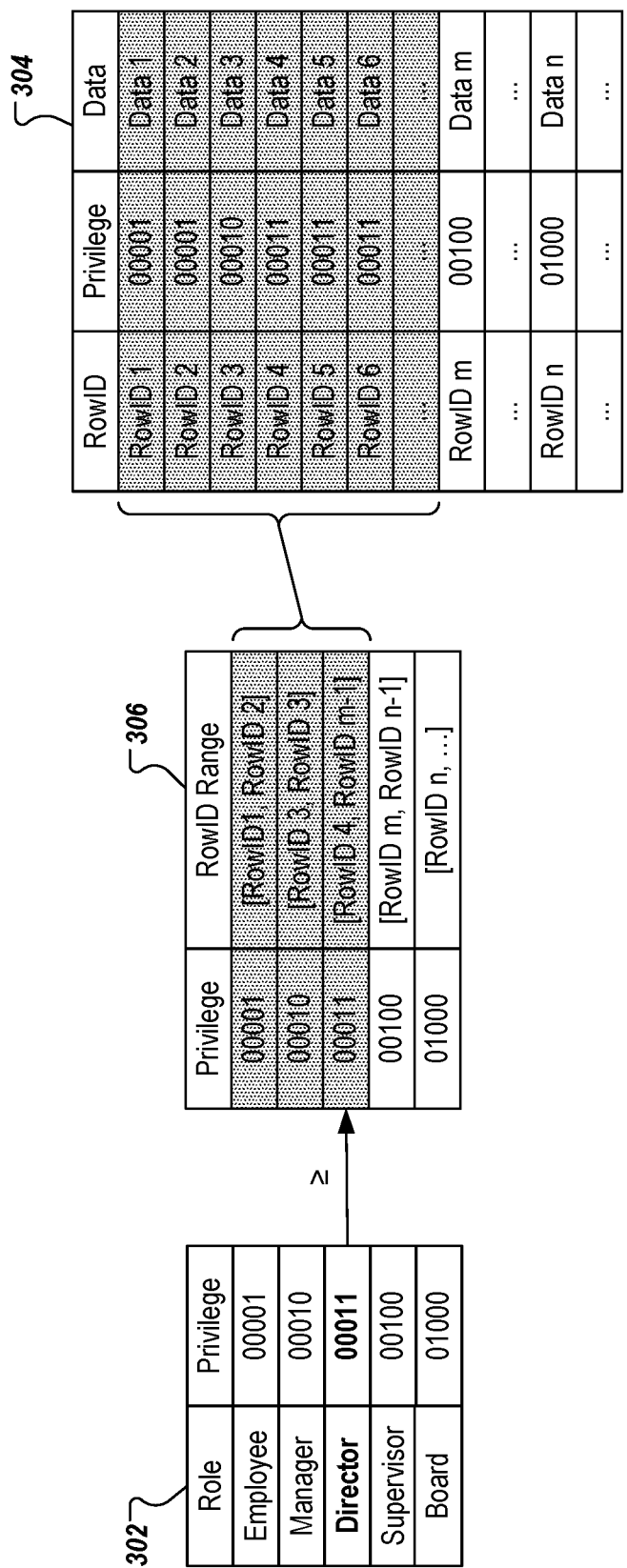

FIGS. 3A-3C depict an example of role-based row-level security in accordance with implementations of the present disclosure. The example of FIGS. 3A-3C include an authorization data table 302, a data table 304, and a row range table 306.

The authorization data table 302 includes a set of roles (e.g., employee, manager, director, supervisor, board) and, for each role, a privilege level. In the example of FIGS. 3A-3C, each privilege level is provided as a multi-bit (e.g., 5-bit) binary number. It is contemplated, however, that privilege levels can be provided in any appropriate format. In some examples, a single authorization data table 302 is provided for the database system.

The data table 304 is to be queried for records that are responsive to a query. Although a single data table is depicted, it is contemplated that the database system can maintain hundreds, thousands, or even more data tables. The data table 304 includes a privilege column to store a privilege level assigned to each record (row) of the data table 304. In accordance with implementations of the present disclosure, the records are sorted in privilege order. That is, for each privilege level, a set of rows is provided in consecutive order, each row in the set of rows being assigned the same privilege level. In the example of FIGS. 3A-3C, the privilege order is provided in increasing order (e.g., the multi-bit binary numbers increase. It is contemplated, however, that any appropriate privilege order can be used (e.g., decreasing).

The row range table 306 records, for each privilege level, a row range indicating the set of rows that is associated with the respective privilege level. Each row range includes a start row and an end row and accounts for all rows located between the start row and the end row inclusive (i.e., including the start row and the end row). For example, for the example privilege level of 00001, a respective row range includes rows having row identifiers RowID 1 to RowID2, while the example privilege level of 00011, a respective row range includes rows having row identifiers RowID 4 to RowID m−1. The row range table 306 is specific to the data table 304. That is, for each data table, a respective row range table is provided.

With particular reference to FIG. 3B, a query can be received. In some examples, the query includes user role data (query authorization data) that indicates one or more roles assigned to the user that submitted the query. In response to the query, the user role data can be used to index the role table 302 to determine a privilege level of the user. In the example of FIG. 3B, the user role data indicates a role of employee, which corresponds to a privilege level of 00001. The privilege level is used to index the row range table 306, for example, as a privilege level index, to determine a row range of the data table 304 that corresponds to the 00001 privilege level. In some implementations, the privilege level index is compared to privilege levels of the row range table 306 and rows of the row range table 306 having a privilege level that is less than or equal to the privilege level 306 are identified as corresponding to authorized row ranges. That is, if the privilege level index is greater than or equal to the privilege level of a row in the row range table 306, the row range of the respective row are determined to be authorized rows (i.e., rows that the user is authorized to access). In the example of FIG. 3B, it is determined that the user, having a role of employee, is authorized to access rows of the data table 304 in the row range [RowID 1, RowID 2], as authorized rows. In some examples, an authorized row table can be provided (not depicted in FIG. 3B), which includes the rows that the user is authorized to access.

With particular reference to FIG. 3C, a query can be received with user role data that indicates a role of director, which corresponds to the privilege level 00011. The privilege level is used to index the row range table 306, for example, as a privilege level index, to determine a row range of the data table 304 that corresponds to the privilege level 00011. In the example of FIG. 3C, it is determined that the user, having a role of director, is authorized to access rows of the data table 304 in the row ranges [RowID 1, RowID 2], [RowID 3, RowID 3], and [RowID 4, RowID m−1]. In short, the director role is able to access the row range [RowID 1, RowID m−1] as authorized rows. In some examples, an authorized row table can be provided (not depicted in FIG. 3C), which includes the rows that the user is authorized to access.

Figure 4A:
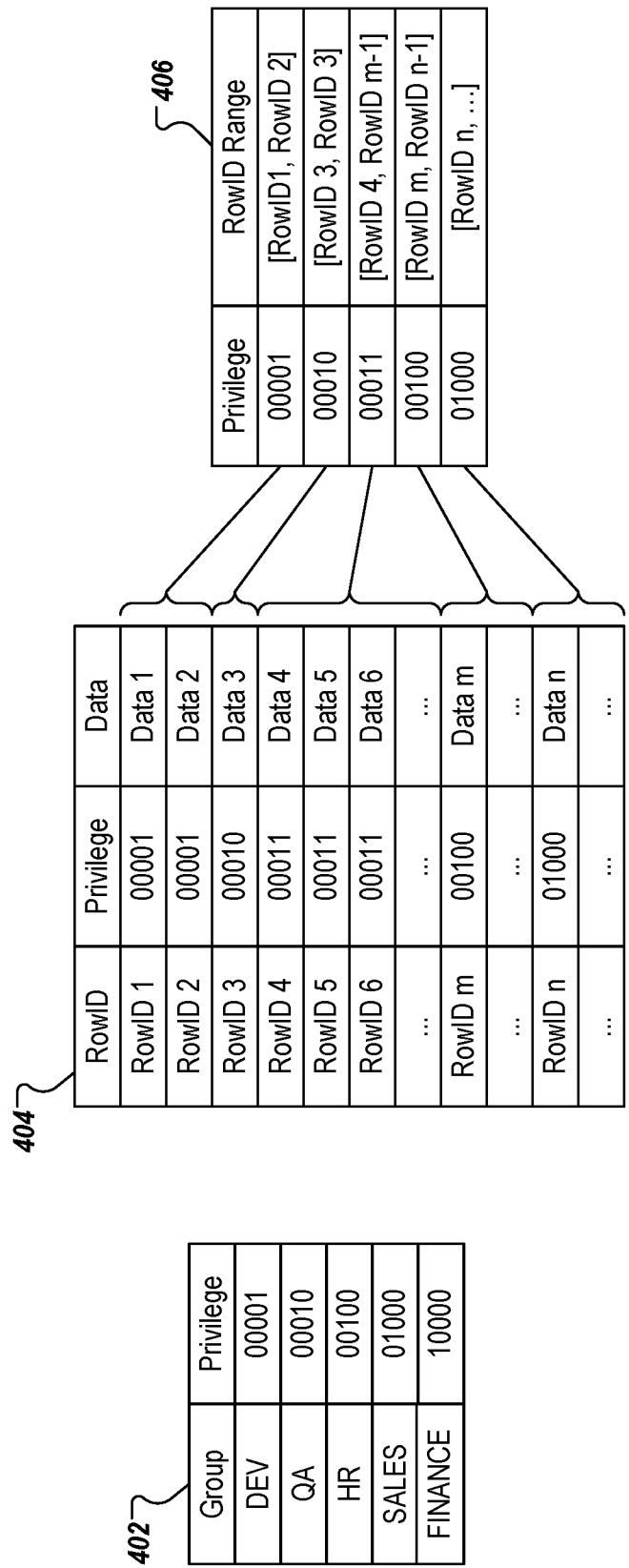
FIGS. 4A-4C depict an example of group-based row-level security in accordance with implementations of the present disclosure.
Figure 4B:
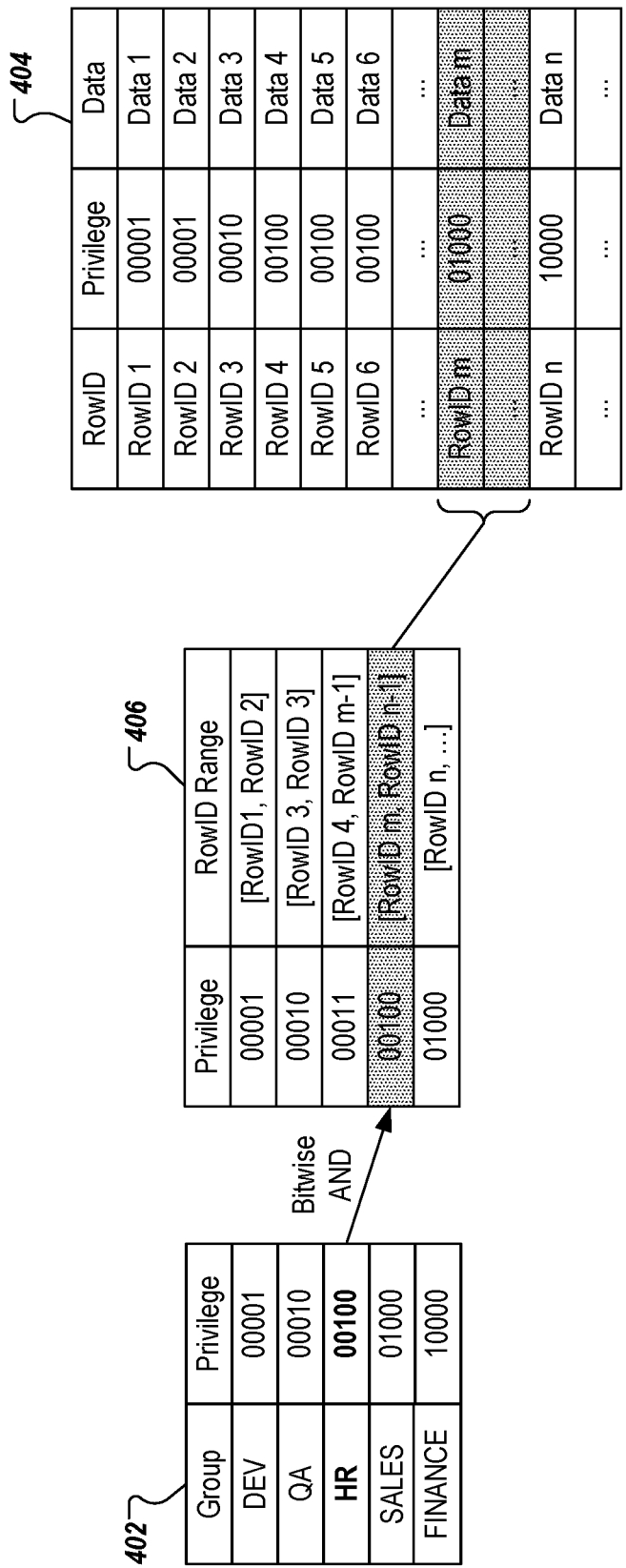
Figure 4C:
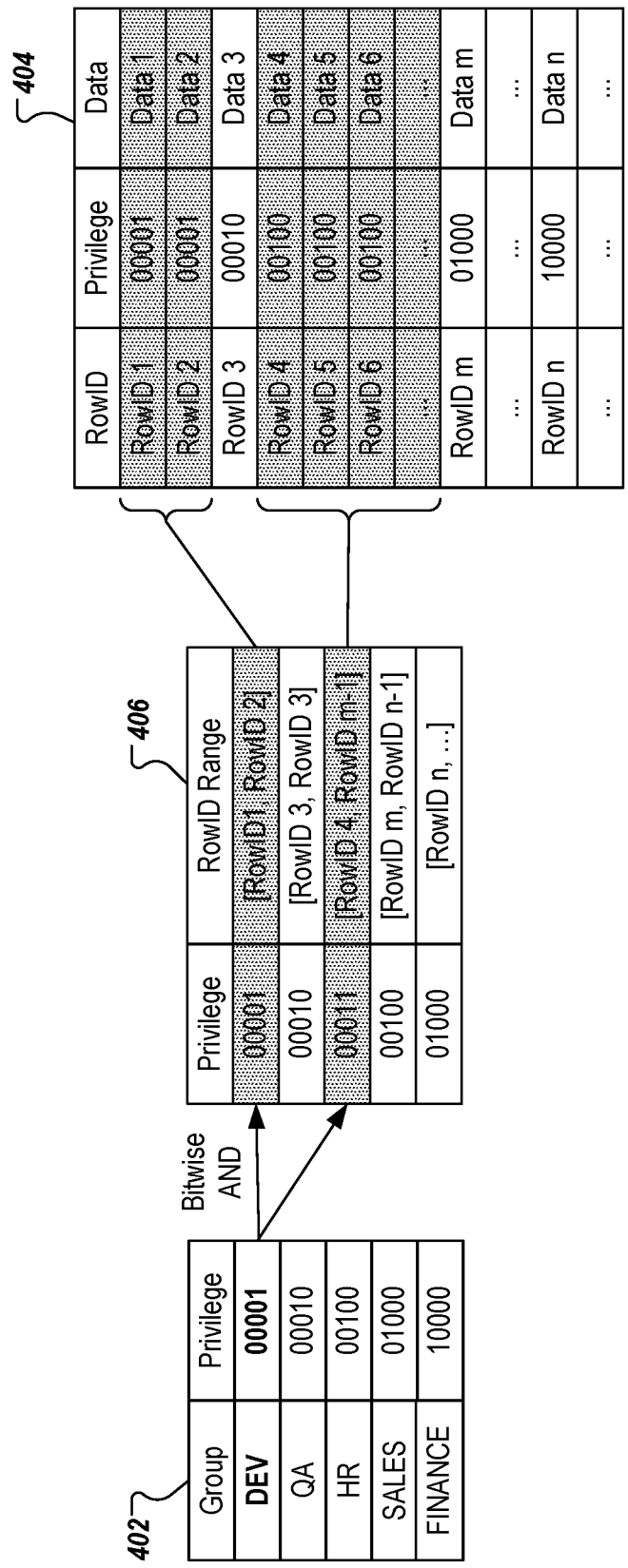

FIGS. 4A-4C depict an example of group-based row-level security in accordance with implementations of the present disclosure. The example of FIGS. 4A-4C include an authorization data table 402, a data table 404, and a row range table 406.

The authorization data table 402 includes a set of groups (e.g., development, quality assurance, human resources, sales, finance) and, for each group, a privilege level. In the example of FIGS. 4A-4C, each privilege level is provided as a multi-bit (e.g., 5-bit) binary number. It is contemplated, however, that privilege levels can be provided in any appropriate format. In some examples, a single authorization data table 402 is provided for the database system.

The data table 404 is to be queried for records that are responsive to a query. Although a single data table is depicted, it is contemplated that the database system can maintain hundreds, thousands, or even more data tables. The data table 404 includes a privilege column to store a privilege level assigned to each record (row) of the data table 404. In accordance with implementations of the present disclosure, the records are sorted in privilege order. That is, for each privilege level, a set of rows is provided in consecutive order, each row in the set of rows being assigned the same privilege level. In the example of FIGS. 4A-4C, the privilege order is provided in increasing order (e.g., the multi-bit binary numbers increase. It is contemplated, however, that any appropriate privilege order can be used (e.g., decreasing).

The row range table 406 records, for each privilege level, a row range indicating the set of rows that is associated with the respective privilege level. Each row range includes a start row and an end row and accounts for all rows located between the start row and the end row inclusive (i.e., including the start row and the end row). For example, for the example privilege level of 00001, a respective row range includes rows having row identifiers RowID 1 to RowID2, while the example privilege level of 00011, a respective row range includes rows having row identifiers RowID 4 to RowID m−1. The row range table 406 is specific to the data table 404. That is, for each data table, a respective row range table is provided.

With particular reference to FIG. 4B, a query can be received. In some examples, the query includes user group data (query authorization data) that indicates one or more groups assigned to the user that submitted the query. In response to the query, the user group data can be used to index the authorization data table 402 to determine a privilege level of the user. In the example of FIG. 4B, the user group data indicates a group of human resources, which corresponds to a privilege level of 00100. The privilege level is used to index the row range table 406, for example, as a privilege level index, to determine a row range of the data table 304 that corresponds to the privilege level 00100. In some implementations, the privilege level index is compared to privilege levels of the row range table 406 and rows of the row range table 406 using a bitwise AND operation to identify authorized row ranges. The bitwise AND operation compares each bit of the privilege level index to the corresponding bit of the privilege. If both bits are 1, the corresponding result bit is set to 1, otherwise, the corresponding result bit is set to 0.

If the bitwise AND operation results in zero (e.g., 00000), the user is not authorized to access the respective row. In the example of FIG. 4B, the bitwise AND operation for the row including the privilege level 00100 results in 00100, and results in 00000 for all other rows. Consequently, in the example of FIG. 4B, it is determined that the user, being assigned to the human resources group, is authorized to access rows of the data table 404 in the row range [RowID 1, RowID 2], as authorized rows. In some examples, an authorized row table can be provided (not depicted in FIG. 4B), which includes the rows that the user is authorized to access.

With particular reference to FIG. 4C, a query can be received with user group data that indicates the development group, which corresponds to the privilege level 00001. The privilege level is used to index the row range table 406, for example, as a privilege level index, to determine a row range of the data table 404 that corresponds to the privilege level 00001. In the example of FIG. 4C, it is determined that the user, being in the development group, is authorized to access rows of the data table 304 in the row ranges [RowID 1, RowID 2] and [RowID 4, RowID m−1]. That is, the bitwise AND operation between 00001 (privilege level index) and 00001 (row range table) and between 00001 (privilege level index) and 00011 (row range table) both result in 00001, which is non-zero, but results in zero (00000) for all other row ranges. In some examples, an authorized row table can be provided (not depicted in FIG. 4C), which includes the rows that the user is authorized to access.

Figure 5:
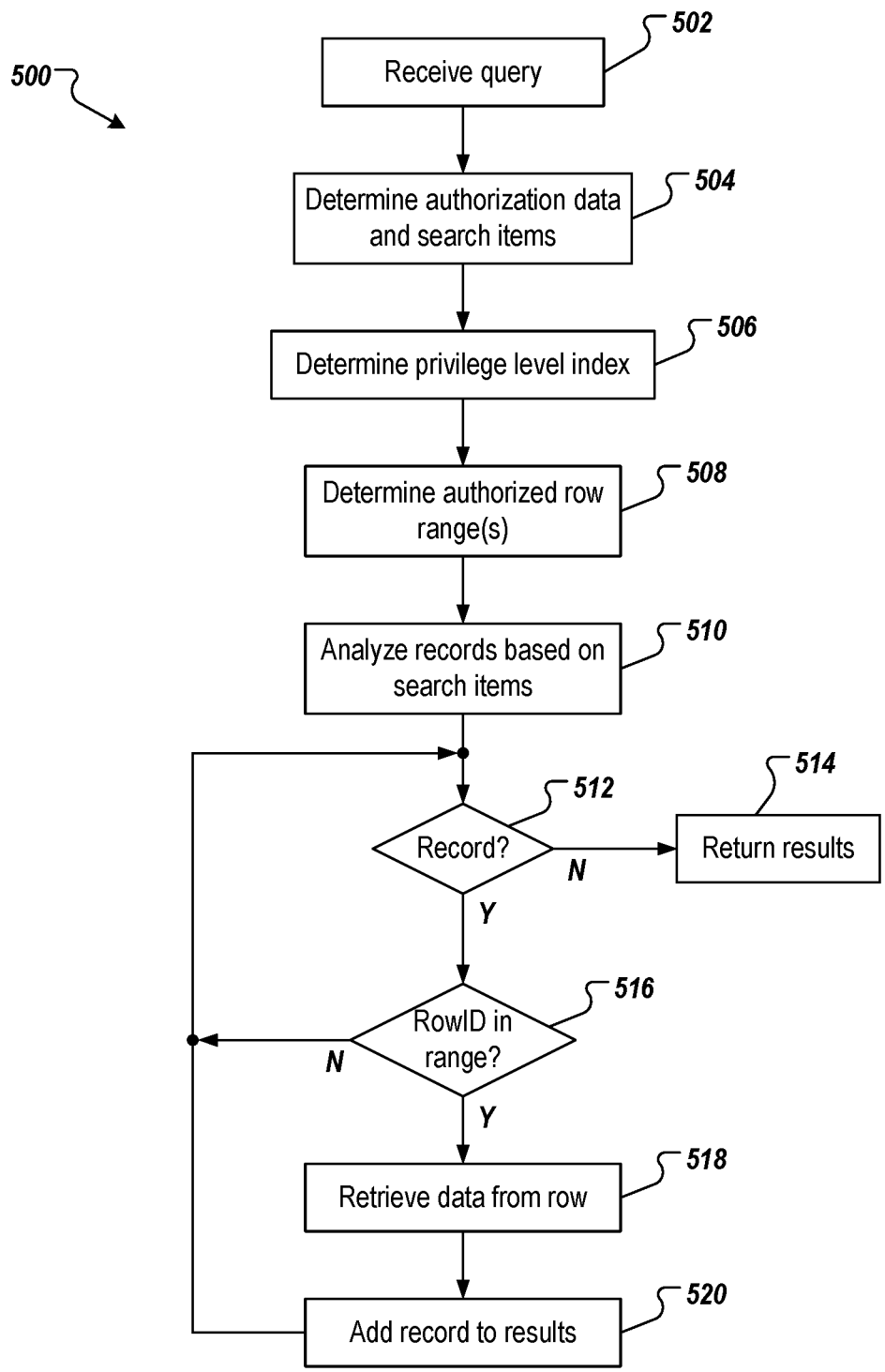
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A query request is received (502). For example, and as described in detail herein, a user can submit a query request to a database system, the query request including a query (e.g., select*from T where name='ACME') and authorization data (e.g., user role data, user group data). Authorization data and search items are determined (504). For example, and as described in detail herein, authorization data is determined from the query request and search items are determined from the query (e.g., table T, name=ACME). A privilege level index is determined (506). For example, and as described in detail herein, the authorization data of the query request is used as a privilege index. One or more authorized row ranges are determined (508). For example, and as described in detail herein, the privilege index is compared to privilege levels assigned to respective row ranges within a row range table. In some examples, for role-based row-level security, the comparison determines whether the privilege level index is greater than or equal to privilege levels of respective row ranges. In some examples, for group-based row-level security, the comparison is executed as a bitwise AND operation. In some examples, an authorized row table is provided, which includes the rows that the user is authorized to access.

Records are analyzed based on the search items (510). For example, and as described in detail herein, a data table is searched to identify records that are responsive to search items of the query (e.g., records that include the name ACME), and initial search results are provided. In some examples, the initial search results include all records of the data table that are responsive to the search items of the query. It is determined whether all records in the initial search results have been analyzed for privilege (512). For example, and as described in detail herein, each record of the initial search results is analyzed to determine whether the user is authorized to access the record. If all records have been analyzed, a final results set is returned (514). For example, records of the final results set are transmitted to the user for display.

It is determined whether the RowID of a record in the initial search results is included in the authorized row range(s) (516). For example, the RowID of the record is compared to the one or more authorized row ranges (e.g., of the authorized row table) to determine whether the RowID lies within at least one range. If the RowID of the record in the initial search results is not included in the authorized row range(s), the example process 500 loops back to check a next record of the initial search results, if any. If the RowID of the record in the initial search results is included in the authorized row range(s), the data is retrieved from the row (518) and is included in the final results set.

Figure 6:
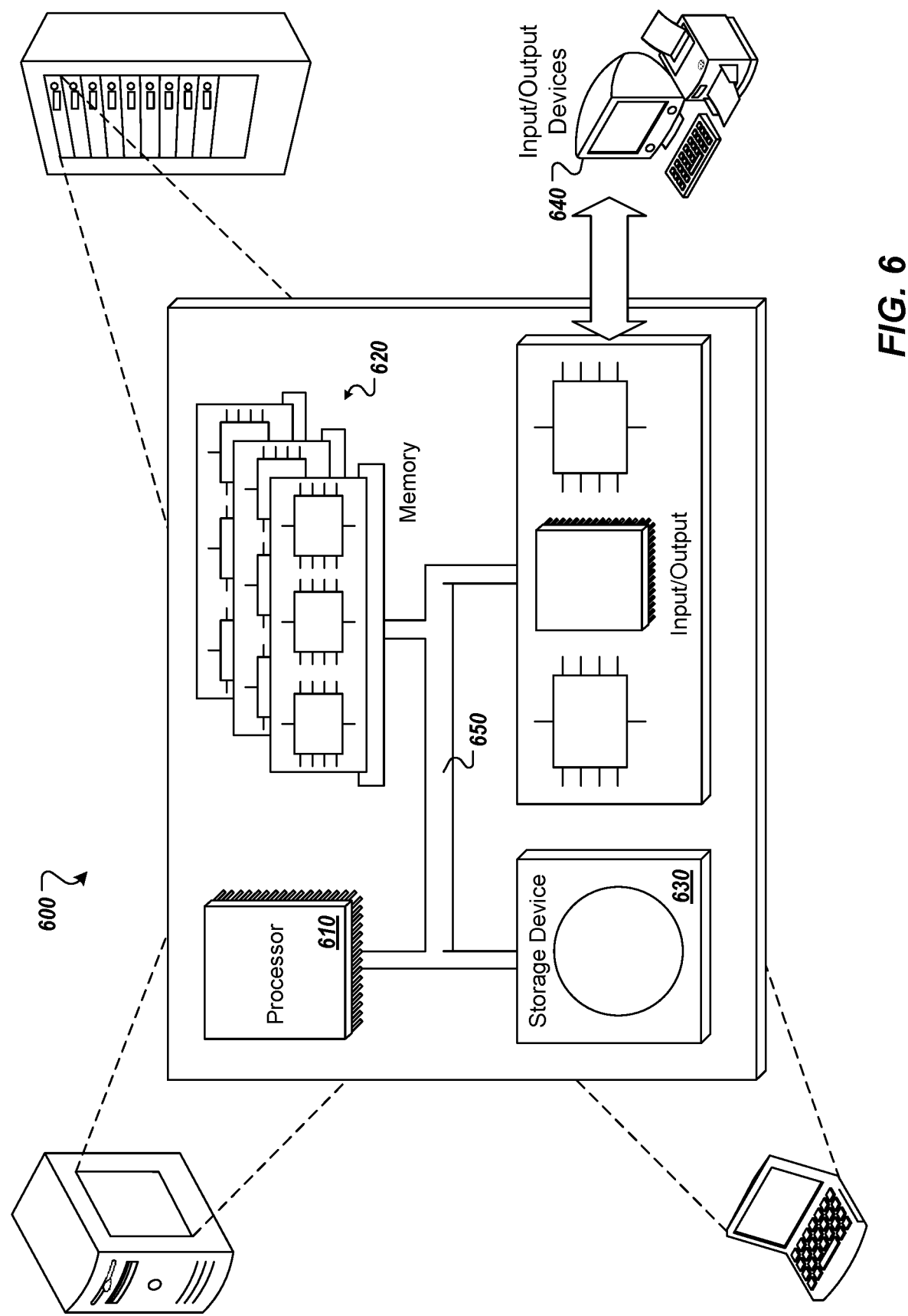
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for row-level security in database systems, the method being executed by one or more processors and comprising:
    receiving, by a database system, a query request comprising authorization data and a query, the authorization data indicating a privilege level index determined from an authorization data table comprising one of a set of roles and a set of groups within an enterprise;
    determining, by the database system, a set of row ranges based on the privilege level index and a row range table, the set of row ranges comprising one or more row ranges having a privilege level associated therewith in the row range table, each row range corresponding to a respective privilege level and comprising a start row and an end row to account for all rows located between the start row and the end row inclusive;
    providing, by the database system, an initial results set comprising one or more records of a data table that are determined to be responsive, records in the data table being ordered based on privilege level;
    determining, by the database system, a final results set comprising at least one record of the initial results set, the at least one record being included in the final results set in response to determining that the at least one record is included in a row range of the set of row ranges; and
    outputting, by the database system, the final results set as at least a portion of a query result.

2. The method of claim 1, wherein determining a set of row ranges based on the privilege level index and a row range table comprises comparing the privilege level index to each privilege level to provide a comparison, and including respective row ranges in the set of row ranges based on respective comparisons.

3. The method of claim 2, wherein a comparison indicates a non-zero value and, in response, a respective row range is included in the set of row ranges.

4. The method of claim 2, wherein a comparison indicates a less than or equal to relationship and, in response, a respective row range is included in the set of row ranges.

5. The method of claim 1, wherein the authorization data comprises one or more of group data and role data.

6. The method of claim 1, wherein the privilege level index and privilege levels of the row range table are each provided as an n-bit number.

7. The method of claim 1, wherein the row range table is specific to the data table.

8. A non-transitory computer-readable storage medium coupled to one or more processors and having instructions stored thereon which, when executed by the one or more processors, cause the one or more processors to perform operations for row-level security in database systems, the operations comprising:
    receiving, by a database system, a query request comprising authorization data and a query, the authorization data indicating a privilege level index determined from an authorization data table comprising one of a set of roles and a set of groups within an enterprise;
    determining, by the database system, a set of row ranges based on the privilege level index and a row range table, the set of row ranges comprising one or more row ranges having a privilege level associated therewith in the row range table, each row range corresponding to a respective privilege level and comprising a start row and an end row to account for all rows located between the start row and the end row inclusive;
    providing, by the database system, an initial results set comprising one or more records of a data table that are determined to be responsive, records in the data table being ordered based on privilege level;
    determining, by the database system, a final results set comprising at least one record of the initial results set, the at least one record being included in the final results set in response to determining that the at least one record is included in a row range of the set of row ranges; and
    outputting, by the database system, the final results set as at least a portion of a query result.

9. The non-transitory computer-readable storage medium of claim 8, wherein determining a set of row ranges based on the privilege level index and a row range table comprises comparing the privilege level index to each privilege level to provide a comparison, and including respective row ranges in the set of row ranges based on respective comparisons.

10. The non-transitory computer-readable storage medium of claim 9, wherein a comparison indicates a non-zero value and, in response, a respective row range is included in the set of row ranges.

11. The non-transitory computer-readable storage medium of claim 9, wherein a comparison indicates a less than or equal to relationship and, in response, a respective row range is included in the set of row ranges.

12. The non-transitory computer-readable storage medium of claim 8, wherein the authorization data comprises one or more of group data and role data.

13. The non-transitory computer-readable storage medium of claim 8, wherein the privilege level index and privilege levels of the row range table are each provided as an n-bit number.

14. The non-transitory computer-readable storage medium of claim 8, wherein the row range table is specific to the data table.

15. A system, comprising:
    a computing device; and
    a computer-readable storage device coupled to the computing device and having instructions stored thereon which, when executed by the computing device, cause the computing device to perform operations for row-level security in database systems, the operations comprising:
        receiving, by a database system, a query request comprising authorization data and a query, the authorization data indicating a privilege level index determined from an authorization data table comprising one of a set of roles and a set of groups within an enterprise;
        determining, by the database system, a set of row ranges based on the privilege level index and a row range table, the set of row ranges comprising one or more row ranges having a privilege level associated therewith in the row range table, each row range corresponding to a respective privilege level and comprising a start row and an end row to account for all rows located between the start row and the end row inclusive;
        providing, by the database system, an initial results set comprising one or more records of a data table that are determined to be responsive, records in the data table being ordered based on privilege level;
        determining, by the database system, a final results set comprising at least one record of the initial results set, the at least one record being included in the final results set in response to determining that the at least one record is included in a row range of the set of row ranges; and
        outputting, by the database system, the final results set as at least a portion of a query result.

16. The system of claim 15, wherein determining a set of row ranges based on the privilege level index and a row range table comprises comparing the privilege level index to each privilege level to provide a comparison, and including respective row ranges in the set of row ranges based on respective comparisons.

17. The system of claim 16, wherein a comparison indicates a non-zero value and, in response, a respective row range is included in the set of row ranges.

18. The system of claim 16, wherein a comparison indicates a less than or equal to relationship and, in response, a respective row range is included in the set of row ranges.

19. The system of claim 15, wherein the authorization data comprises one or more of group data and role data.

20. The system of claim 15, wherein the privilege level index and privilege levels of the row range table are each provided as an n-bit number.

* * * * *